UNITED STATES PATENT OFFICE.

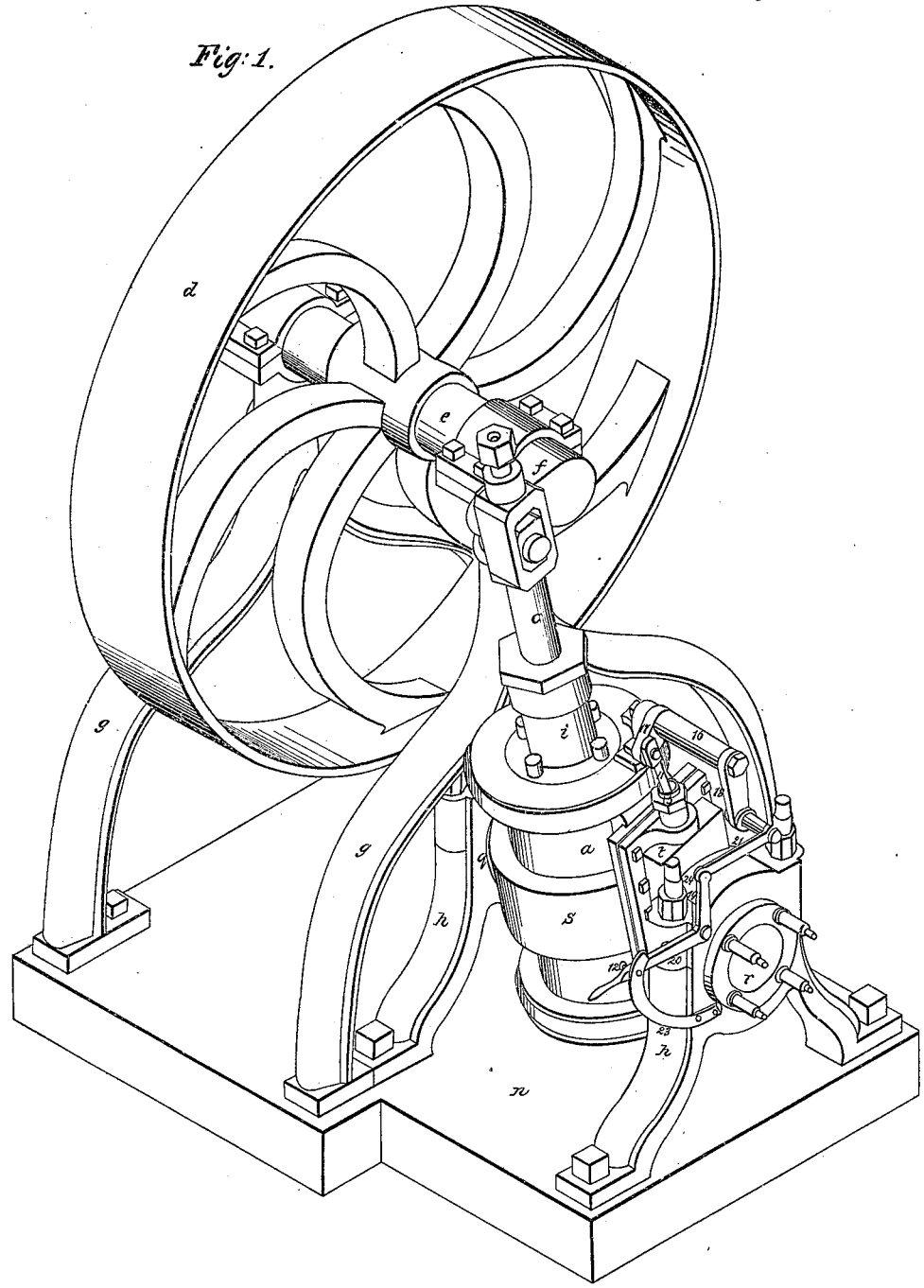

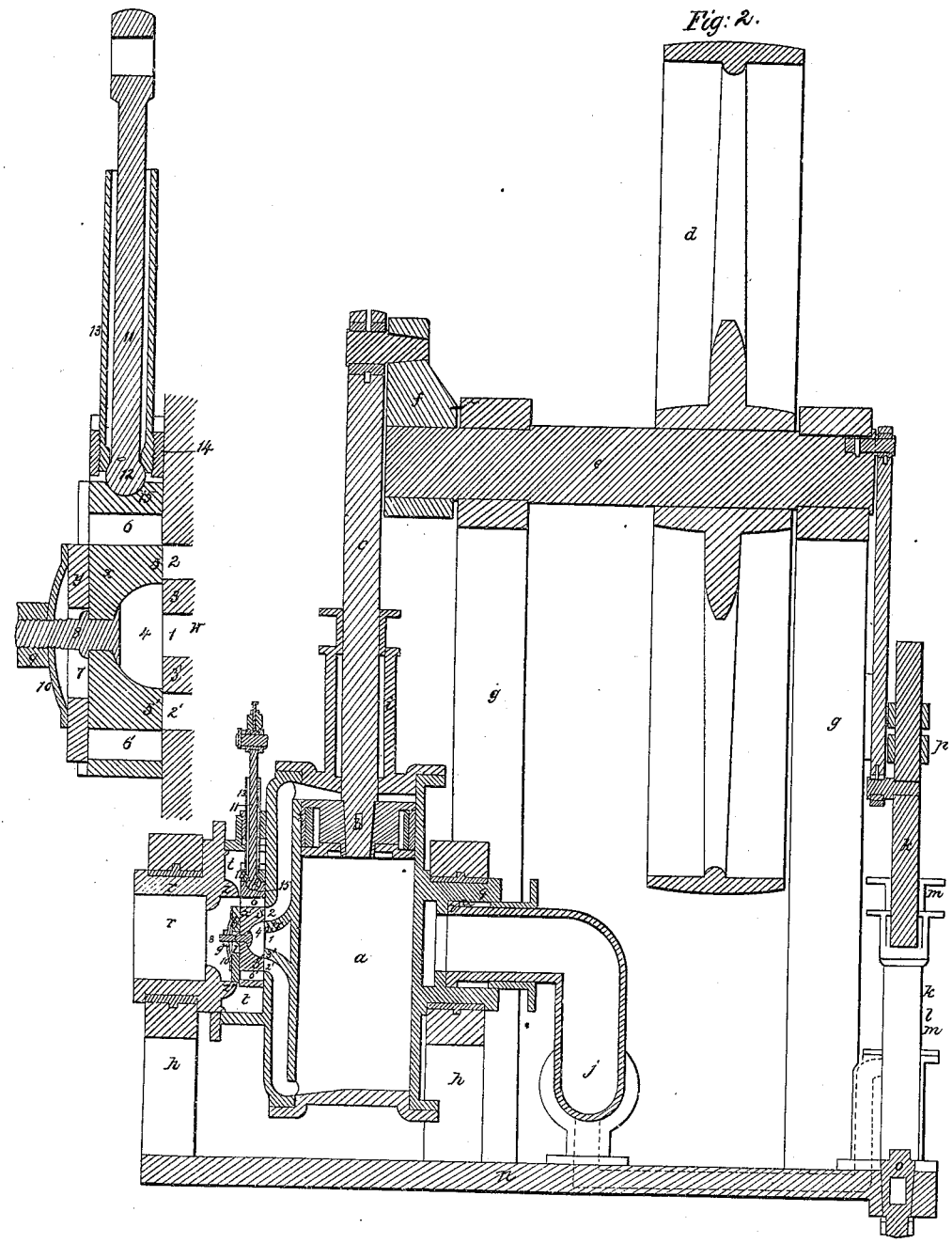

SAML. H. GILMAN, OF CINCINNATI, OHIO.

METHOD OF CONNECTING SLIDE-VALVES WITH ROCK-SHAFTS.

Specification of Letters Patent No. 7,871, dated January 1, 1851.

*To all whom it may concern:*

Be it known that I, SAMUEL H. GILMAN, of Cincinnati, in the county of Hamilton and State of Ohio, have invented new and useful Improvements in the Oscillating Steam-Engine; and I do hereby declare the following to be a full, clear, and exact description of the nature, construction, and operation of the same, reference being had to the annexed drawings, making part of this specification, in which—

Figure 1, represents a general perspective view of an engine embodying my improvement; Fig. 2 a section through the main shaft and trunnions; Fig. 3, an enlarged view of the valve and its appendages.

Like letters have reference to the same or similar parts in the different figures.

The cylinder ($a$), piston ($b$), piston rod ($c$), fly wheel ($d$), main shaft ($e$), crank ($f$), standards ($g$, $h$), guide stuffing box ($i$), heater ($j$), pump rods ($k$), force pump ($l$), lifting pump ($m$), bed plate ($n$), water cock ($o$), cross head ($p$).

The trunnions ($q$, $r$,) and the steam passages ($s$) cast around the cylinder communicating between the valve chamber and rear trunnion ($q$) need no particular description here.

Upon the side of the cylinder which has been usually occupied by the trunnion, is the valve seat ($w$), with the usual exhaust opening (1) at its center and a supply opening (2—2') upon each side of it.

The rod (11) by which the valve is drawn to and fro, terminates at its lower extremity in a ball joint (12) allowing of the aberration of the rod in conformance with the sweep of the arm which operates it. (13) is a tubular rod which screwing within the socket (14) of the valve, forms a clamp or cap for the joint at its lower end, and a guide rod for the valve. The upper portion (15) of the valve, acts in concert with the rod (13) to form the socket for the joint.

Pivoted to a lug upon the cylinder head is a rock shaft (16), one arm (17) of which is pivoted to the valve rod (11), the other arm (18) projecting downward, is linked to the counter arm (19) of the starting bar or hand lever (20), by the rod or link (21). This handle being fixed at the middle of its sweep by the pin (22) to the quadrant (23), the joint (24) of the arm (19) becomes a fixed fulcrum, upon which the valve gearing vibrates by the motion of the cylinder.

Having thus fully described the nature and construction of my improvements in oscillating steam engines what I claim therein as new and desire to secure by Letters Patent is—

The tubular nut (13) serving the two-fold purpose of a guiding rod and of a clamp for the ball joint at the foot of the valve pitman.

In testimony whereof, I have hereunto set my hand before two subscribing witnesses.

SAMUEL H. GILMAN.

Witnesses:
EDWARD H. KNIGHT,
GEO. H. KNIGHT.